Registered Dec. 14, 1943

2,336,792

UNITED STATES PATENT OFFICE 2,336,792

RUBBER PRODUCT

Carl M. Langkammerer, Wilmington, Del., and William S. Gocher, Fairfield, and Alfred J. Jennings, Bridgeport, Conn., assignors to E. I. du Pont de Nemours & Company, Wilmington, Del., a corporation of Delaware No Drawing. Application March 14, 1941,
Serial No. 383,444

9 Claims. (Cl. 117—76)

This invention relates to rubber articles and more particularly to surface-coated rubber articles.

A large variety of film-forming materials have heretofore been used as protective and/or decorative coatings for rubber, among them varnishes, shellac, cellulose esters, and various synthetic resinous materials. The surface-coated rubber products previously prepared, however, have been deficient in one or more of the requirements of flexibility, adhesion of the finish to the rubber base, insufficient toughness, as evidenced by cracking on bending, and poor durability on outdoor exposure. Coatings having a drying oil base, e. g., orthodox varnishes, and drying oil modified alkyd and phenolaldehyde resins have fair adherence to rubber and good flexibility when first applied, but upon aging these coatings lose their elasticity. Antioxidants present in the rubber base inhibit drying of the coating and this makes it necessary to use long baking periods to obtain proper drying of the coating. Driers present in the coating to accelerate drying have an adverse effect on the aging properties of the rubber base. Oil base finishes do not have satisfactory resistance to vegetable and hydrocarbon oils and for many applications products having such finishes are unusable.

Films which dry by solvent evaporation and undergo no further chemical change overcome some of the defects inherent to drying oil base coatings. For instance, cellulose acetate, cellulose nitrate, and polymers of acrylic acid derivatives adhere to rubber, but so far as we are aware none of the previously used coatings for rubber will withstand the degree of scrubbing and flexing that is required in coated fabrics subject to severe usage, such as in upholstery materials. A number of vinyl resin compositions have been proposed for coating rubber, but such finishes lack proper adhesion to rubber and in this respect are deficient. Adhesion can be improved by baking at high temperatures but this remedy, although satisfactory for hard rubber, cannot be used with soft rubber compositions because of degradation. As far as we know there are no satisfactory vinyl resin finishes for rubber, particularly for rubber surfaces which are to be exposed to the weather.

This invention has as an object the production of rubber articles having an improved finish. A further object is the preparation of rubber coated fabrics in which the rubber surface carries a flexible, highly adherent, coating of improved wearing qualities and appearance. Other objects will appear hereinafter.

The above objects are accomplished by applying to the surface of the rubber article a film of a composition comprising a mixture of a phenol-aldehyde resin and a vinyl resin. We have discovered that when this composition is applied to rubber, the films show greater adherence, improved wearing, abrasion-resistance, water-resistance, and hardness than do films of either of the resins alone.

The term "vinyl resins" as used herein refers to the class of resins, well known to the art, obtained by polymerizing organic compounds having the formula

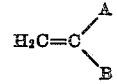

wherein A is selected from the class consisting of hydrogen, halogen, and hydrocarbon radicals and B is selected from the class consisting of halogen and organic radicals containing a carbon atom joined to another atom by a plural bond, the carbon atom being removed from the $H_2C\!=\!C\!=$ radical by not more than one atom. Typical examples are the polyvinyl esters, polyvinyl halides, polyvinyl acetals, polyvinyl ethers, polyacrylic and polymethacrylic acids, esters, nitriles, and amides, etc.

The phenol-aldehyde resins used in the present compositions can be of the thermoplastic type but greater adhesion and best results are obtained with thermosetting phenol-aldehyde resins which become insoluble and infusible on being subjected to a heat-treatment.

The phenol-aldehyde and vinyl resins can most satisfactorily be blended from solutions in mutual solvents. For this reason the most desirable resins are those which are soluble in the common organic solvents. Of the heat reactive phenol-aldehyde resins, low condensed products known as resoles are most suitable because of their solubility. More highly condensed phenol-aldehyde resins and insoluble vinyl type resins can be employed, however, in the form of emulsions or dispersions. The most desirable blends of phenol-aldehyde and vinyl resins are those which are compatible either upon air-drying or on baking. Best adhesion is obtained by giving the coated rubber article a heat-treatment after coating.

A phenol-formaldehyde resin particularly valuable for the present purpose is the resole obtained by reacting formaldehyde with 2,2-di-(4-hydroxyphenyl)-propane, which for best results should be used in a relatively pure form. The condensation with formaldehyde is carried out by charging the reaction vessel with

| | Parts |
|---|---|
| 2,2-di-(4-hydroxyphenyl)-propane | 228 |
| 37% aqueous formaldehyde solution | 280 |
| 50% aqueous sodium hydroxide | 10 | heating to 80° C., and holding the reaction mixture at this temperature with stirring for about 2½ hours. It is important that the reaction be stopped at the proper point since, if carried too far, the resin loses compatibility with vinyl resins, and if it is not carried far enough the yield of resin is cut down by solution in the wash water.

Since uncontrollable factors in this resin reaction cause it to proceed at different rates in duplicate reactions, products differing rather widely can be obtained. A very convenient test for determining the proper end point of the reaction is as follows: Samples of the reaction mixture are taken at intervals as the reaction proceeds, cooled until they become cloudy, then warmed slowly, and the temperature noted at which they become clear. This temperature (the clear point) increases slowly as the reaction proceeds. The most satisfactory products for use in the present invention are those obtained when the reaction is stopped when the clear point has reached 45° to 55° C. As mentioned above, if the reaction is carried out at 80° C. the time required for this point to be reached is approximately 2½ hours; if the reaction is carried out at 95° C. the time required is only about ½ hour. When the clear point of the reaction mixture has reached the desired point, the reaction is stopped by the addition of 750 parts of cold water. The reaction mixture is then neutralized with dilute hydrochloric acid, the resin layer washed by stirring for ½ hour, the water siphoned off, and the washing process repeated twice more using 750 parts of cold water each time. The excess water is then removed by warming the resin to 50° to 60° C. at a pressure of 10 to 20 mm. After removal of the water, 250 parts of denatured alcohol are added to give a resin solution containing approximately 50% solids.

The invention is further illustrated by the following examples in which the parts are by weight.

Example I

To the side wall of a tire in use is applied by brushing an enamel obtained by grinding for 12 hours the following ingredients in a pebble mill.

| | Parts |
|---|---|
| 20% solids solution of polymethyl acrylate in ethyl acetate | 360 |
| Phenol-formaldehyde resole described above (50% solids) | 48 |
| Titanium dioxide | 72 |
| Butyl acetate | 192 |
| 85% phosphoric acid | 1.5 |

The coating is very adherent and maintains this adhesion for several months. Compared with a commercial side wall tire paint which is usually a rubber-base paint, the product of this example has the following advantages: (1) it dries faster; (2) it has better abrasion resistance; (3) it chalks less on exposure; and (4) it can be used much more satisfactorily on a new tire.

A golf ball coated with the above composition after 18 holes of play is still in good condition, and the coating shows no signs of peeling.

Example II

A coating composition consisting of the following ingredients is applied to the rubber surface of a rubberized fabric.

| | Parts |
|---|---|
| 20% solids solution of polymethyl acrylate in ethyl acetate | 720 |
| Phenol-formaldehyde resole of Example I | 96 |
| Delusterant | 162 |
| Ethyl acetate | 144 |

The delusterant is a suspension of 21 parts of silica and 9 parts zinc stearate ground in a mixture of isobutyl acetate and amyl acetate.

The rubberized fabric is one obtained by coating cotton sateen with an anchor coat of rubber cement followed by a calender coat of a rubber composition comprising a properly formulated stock of pale crepe rubber, pigments, fillers, sulfur, accelerator, and antioxidant. After calendering, the rubber coated article is embossed, heated for two hours at 260° F. to vulcanize the rubber, roller coated with two coats of a 6% carbon tetrachloride solution of sulfur chloride and finally, after standing for a short time, neutralized by festooning in a chamber of ammonia vapors. After applying two coats of the phenol-formaldehyde resole-polymethyl acrylate composition with a doctor knife, the product is suspended in a heater and baked for one hour in the presence of a small amount of ammonia. The product is highly resistant to gasoline and other hydrocarbons, and has very good resistance to wet crocking, and high abrasion, flex and scrub resistance. These properties make this product particularly useful in the manufacture of shoe uppers, travelling cases, as an upholstery material, etc. Rubberized fabrics designed for the same uses are inferior to the above product in the above enumerated properties.

When the rubber surface is coated with a composition differing from that of the above example only in that the phenol-aldehyde resole is omitted, the film is removed upon vigorous scrubbing. If the sulfur chloride treatment is omitted, a product having still less adhesion is obtained. These products show that the adhesion of a film of polymethyl acrylate for rubber is increased by incorporating a phenol-formaldehyde resin in the film and that a still further improvement in adhesion is obtained by first treating the rubber base with sulfur chloride.

Example III

A rubberized fabric similar to that used in the above example, except that the sulfur chloride treatment is omitted, is coated with the following composition:

| | Parts |
|---|---|
| Polyvinyl butyral resin | 14 |
| The phenol-formaldehyde resole described in Example I (50% solids) | 14 |
| Denatured alcohol | 174 |

The polyvinyl butyral resin is known commercially as "Butacite" and is made in accordance with U. S. Patent 2,162,676.

The solution is brushed on the rubberized fabric and baked at 127° C. for one hour. A 4% carbon tetrachloride solution of sulfur chloride is then brushed over the surface and, after standing for a short while, neutralized with ammonia. The film has excellent adhesion for the rubber base and cannot be removed by vigorous scrubbing.

Example IV

A hospital sheeting obtained by applying rubber cement to both sides of a silk fabric and then curing the rubberized fabric is coated with a solution consisting of:

| | Parts |
|---|---|
| Polyethyl acrylate | 50 |
| The phenol-formaldehyde resole | 40 |
| Denatured alcohol | 610 |

The resole is a solution containing 56% solids coded BV-1680 by the Bakelite Corporation.

The above coating composition is brushed onto both surfaces of the hospital sheeting and the product then baked for 15 minutes at 240° F. The coated product has a better appearance and better resistance to vegetable oils than a similar uncoated product.

*Example V*

A rubber coated fabric similar to that used in Example II is coated with a composition consisting of 20 parts of the interpolymer of vinyl chloride and vinyl acetate, 16 parts of the phenol-formaldehyde resole described in Example I, and 80 parts of methyl ethyl ketone.

The mentioned interpolymer contains from about 50 to 90% vinyl chloride and is prepared by polymerizing at a temperature below about 60° C. a mixture of vinyl chloride and vinyl acetate in the presence of a suitable liquid medium such as an aliphatic alcohol, ketone, or paraffin hydrocarbon, in the presence of a suitable catalyst such as benzoyl peroxide.

The solution is sprayed on the rubber coated fabric and then baked for 15 minutes at 240° F. The finished product has a brilliant luster and the film is not removed by soaking in water or by vigorous scrubbing. A film of unmodified vinyl chloride-vinyl acetate interpolymer applied to the same fabric and given an identical heat treatment has poor adhesion to the rubber base as evidenced by poor scrub resistance.

The coating compositions described in the following examples are applied to the rubberized fabric described in Example II. In all cases products are obtained in which the films have exceptional adhesion for the rubber base.

*Example VI*

| | Parts |
|---|---|
| Polyisobutyl methacrylate | 18 |
| The phenol-formaldehyde resole solution described in Example I | 4 |
| Denatured alcohol | 180 |

*Example VII*

| | Parts |
|---|---|
| Polyvinyl acetate (low viscosity) | 16 |
| The phenol-formaldehyde resole solution described in Example I | 8 |
| Denatured alcohol | 180 |

*Example VIII*

| | Parts |
|---|---|
| Polymethyl acrylate | 40 |
| The phenol-formaldehyde resole solution described in Example I | 25 |
| Ethyl acetate | 360 |

The phenol-aldehyde resins used in the present invention should preferably be soluble in organic solvents although dispersions of insoluble resins can be used. Among the useful phenol-formaldehyde resins are the thermoplastic resins prepared by reacting formaldehyde with such phenols as o-cresol, p-tertiary-butyl phenol, 2,2-di-(4-hydroxy-3-methylphenyl)-propane, 4-hydroxydiphenyl, and p-hydroxyacetophenone. These phenols have two reactive positions, that is two unsubstituted carbon atoms holding a hydrogen atom ortho or para to a phenolic hydroxyl group. The most desirable phenol-aldehyde resins for the present purpose, however, are the resoles formed by partially reacting a phenol having three or more reactive positions with formaldehyde. Such phenols include phenol itself, meta-cresol, resorcinol, sym.-xylenol, p,p'-dihydroxydiphenyl, 2,2-di-(4-hydroxyphenyl)-propane, 2,2-di-(4-hydroxyphenyl)-cyclohexane and 2,2-di-(4 - hydroxy - 2 - methyl-phenyl)-propane. The phenol-aldehyde resoles may be prepared by any of the known methods. An example of such a preparation, using an alkaline catalyst and a low temperature is described in U. S. Patent 1,614,172. Of the heat reactive resoles tested those prepared from dihydric phenols having four reactive positions have been found most suitable. These phenols are obtained by condensing a phenol having no substituents in the ortho and para positions with an aldehyde or ketone. In place of formaldehyde other aldehydes can be used in preparing the resoles, e. g., propionaldehyde, butyraldehyde, furfuraldehyde, etc. The preferred aldehyde is, however, formaldehyde.

Additional examples of resins of the vinyl type which are useful for the present purpose and which are selected because of their solubility or compatibility with the phenol-aldehyde resin include polymers and interpolymers of methyl-, ethyl-, propyl-, and butylacrylates and the corresponding methacrylates, polymers and interpolymers of vinyl acetate, vinyl propionate and vinyl butyrate as well as their partially hydrolyzed derivatives, such as polyvinyl formal, acetal, and butyral, polymers and interpolymers of vinyl halides such as vinyl chloride and vinylidene chloride, the after chlorinated polyvinyl chloride known commercially as "Igelite PC," vinyl phenyl ethers, polyvinyl ethers, polymers of methylvinyl ketone, polymers of N-vinyl compounds, e. g., vinyl carbazole, N-vinylsuccinimide, N-vinylphthalimide, and polymers and interpolymers of acrylonitrile, methacrylonitrile, methacrylamide, and esters of alpha-chloroacrylic acid, styrene, methylene dimethacrylate, etc.

It is generally desirable that the combination of phenol-aldehyde and vinyl resin be compatible, as evidenced by formation of clear films on air drying and also on baking since films from such blends usually have better physical properties than opaque, incompatible films. There are, however, cases in which a very desirable dull luster can be obtained by partial incompatibility of the resinous components. Although compatibility is generally inherent in the resins being blended, in some instances it can be influenced by proper selection of solvent or solvent combination. Although the properties of the resins can vary widely, the preferred amounts of phenolic resin are from 10 to 40% and the preferred amounts of vinyl resin are from 90 to 60%.

The coating compositions can include in addition to the phenol-aldehyde resins and vinyl resins a variety of other materials such as pigments, fillers, dyes, extenders, antioxidants, catalysts, plasticizers, etc. Any of the materials usually employed as catalysts in phenol-aldehyde resins, e. g., hexamethylene tetramine, oxalic acid or phosphoric acid may be used. In formulating these resinous compositions it has been found particularly advantageous to use phosphoric acid as a catalyst since lighter colored compositions are obtained thereby.

Pigmented compositions have been found to have particular advantages. Using pigmented films it is possible to obtain brighter and more attractive colors as well as a wider range of colors than can be obtained with colored rubber compounds or colored rubber compounds covered with a coat of clear lacquer.

The most satisfactory methods of applying the compositions are from solutions, emulsions, or dispersions. Although air dried films have good adhesion for the rubber surface, an improved adhesion can be obtained by baking the films. The baking temperature can vary over a wide range depending on the particular coating composition and on whether or not a catalyst is used. The temperature may vary from about 90° C. to about 200° C. The time of baking is dependent in turn on the temperature of the bake. At lower temperatures, baking can extend over periods of several hours while a few minutes is sufficient at the higher temperatures. Stabilizing agents can be incorporated in the coating compositions. The films applied can vary in thickness from 0.0001 inch to 0.003 inch, the usual thickness being in the neighborhood of one mil.

The coating compositions of this invention can also be applied to rubber surfaces which have been partially coated with other resinous films. Thus two-tone products can be obtained by applying a base color coat to the embossed fabric, scraping the varnish from the ridges of the embossing, drying, and then applying a clear coat of a composition coming within the scope of this invention over the base color coat.

This invention provides a method for obtaining rubber articles having a protective coating characterized by having improved durability, adhesion of the coating to the rubber base, abrasion, scuff, water and oil resistance, and hardness over products coated either with phenol-aldehyde resins alone or with vinyl resins alone.

Ordinary rubberized fabrics after outdoor exposure when rubbed with a wet cloth discolor the cloth, presumably because of pigment chalking. The products of this invention when similarly tested are free of this defect, even after prolonged outdoor exposure.

The coating compositions described herein are useful in the manufacture of a wide pariety of rubber articles, such as balloon fabrics, upholstery materials, patent leather substitutes, chemically resistant aprons, gas mask fabrics, raincoats and hospital sheeting; molded rubber articles, particularly those subjected to oils or sunlight and outdoor exposure such as engine mounts, windshield wipers, and other molded rubber parts on automobiles and airplanes; conduits for organic liquids, particularly liquids which attack rubber such as gasoline hose and tubing for dispensing fuel oil; and rubber coated insulated electrical conductors. In addition to these uses, the resinous compositions disclosed herein are valuable for use in side wall tire paints and golf ball paints and also as lacquers for rubber footwear.

As many apparently widely different embodiments of this invention may be made without departing from the spirit and scope thereof, it is to be understood that we do not limit ourselves to the specific embodiments thereof except as defined in the appended claims.

We claim:

1. An article of manufacture comprising a rubber article the rubber surface of which has an adherent top coating consisting of a dried film of a coating composition the film-forming material of which consists essentially of a mixture of vinyl resin and a phenol-aldehyde resin, containing from 10% to 40% of the phenol-aldehyde resin and from 90% to 60% of the vinyl resin.

2. The article set forth in claim 1 in which said phenol-aldehyde resin is the reaction product of formaldehyde and a phenol having four reactive positions.

3. The article set forth in claim 1 in which said phenol-aldehyde resin is the reaction product of formaldehyde and 2,2-di-(4-hydroxyphenyl)-propane.

4. The article set forth in claim 1 in which said vinyl resin is polymethyl acrylate.

5. The article set forth in claim 1 in which said vinyl resin is polyvinyl butyral.

6. An article of manufacture comprising a rubber article the rubber surface of which has an adherent top coating consisting of a dried film of a coating composition the film-forming material of which consists essentially of a mixture of polymethyl acrylate and the resinous reaction product of 2,2-di(4-hydroxyphenyl)-propane and formaldehyde, said mixture containing from 10% to 40% of said resinous condensation product and from 90% to 60% of the polymethyl acrylate.

7. An article of manufacture comprising a rubber article the rubber surface of which has an adherent top coating consisting of a dried film consisting essentially of pigment and a mixture of vinyl resin and phenol-aldehyde resin, the vinyl resin and phenol-aldehyde resin in said mixture being present in amount of from 10% to 40% of the phenol-aldehyde resin and from 90% to 60% of the vinyl resin.

8. The article set forth in claim 1 in which said rubber article is a rubber coated fabric.

9. The article set forth in claim 7 in which said rubber article is a rubber coated fabric.

CARL M. LANGKAMMERER.
WILLIAM S. GOCHER.
ALFRED J. JENNINGS.

CERTIFICATE OF CORRECTION.

Patent No. 2,336,792.   December 14, 1943.

CARL M. LANGKAMMERER, ET AL.

It is hereby certified that error appears in the printed specification of the above numbered patent requiring correction as follows: Page 1, upper left-hand corner thereof, for "Registered" read --Patented--; page 4, first column, line 50, for "pariety" read --variety--; and that the said Letters Patent should be read with this correction therein that the same may conform to the record of the case in the Patent Office.

Signed and sealed this 1st day of February, A. D. 1944.

(Seal)

Henry Van Arsdale,
Acting Commissioner of Patents.